Sept. 5, 1933.  L. A. PARADISE ET AL  1,925,276
HARVESTER
Filed April 13, 1931   2 Sheets-Sheet 2
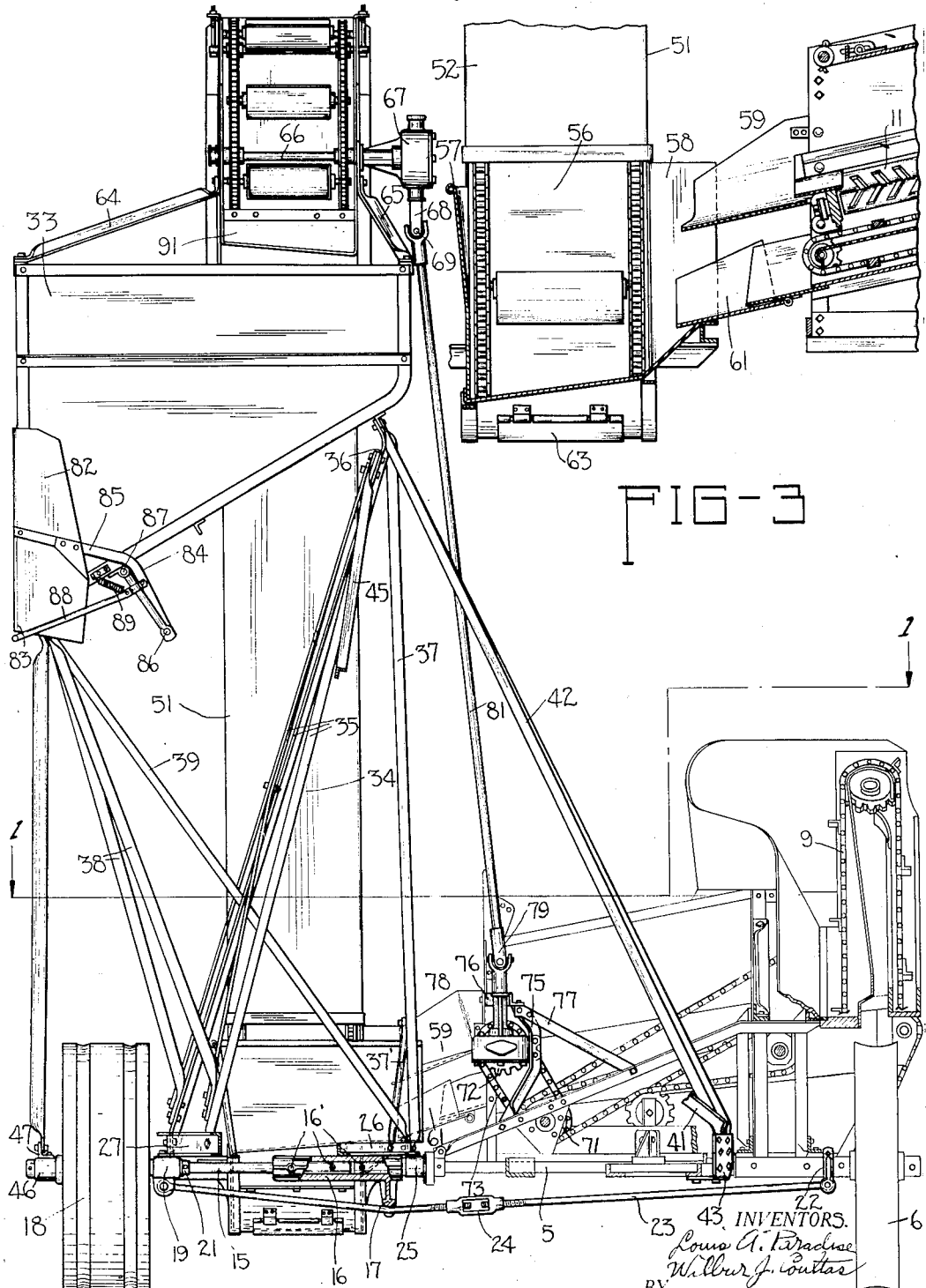

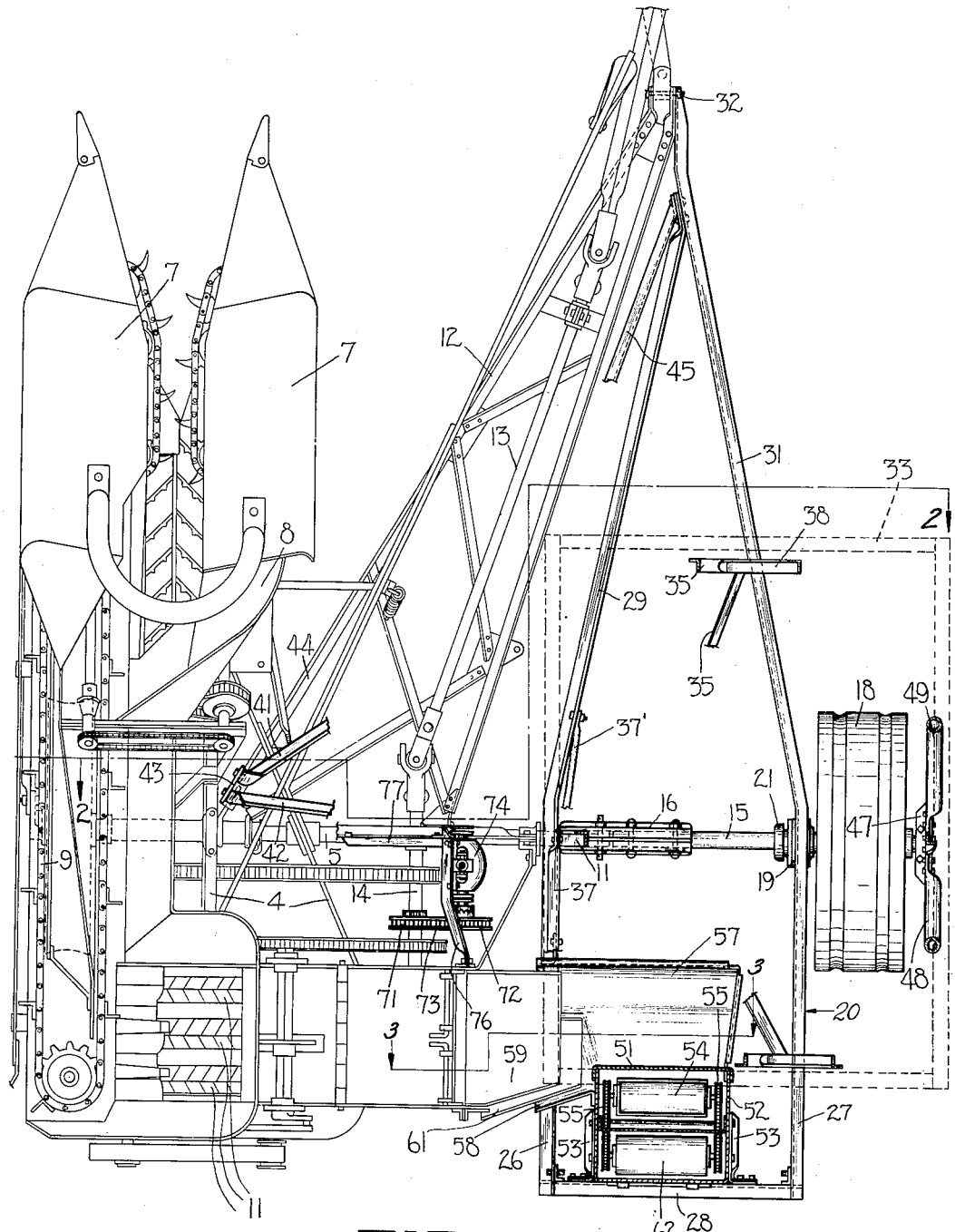

Patented Sept. 5, 1933

1,925,276

UNITED STATES PATENT OFFICE 1,925,276

HARVESTER

Louis A. Paradise and Wilbur J. Coultas, Moline, Ill., assignors to Deere & Company, Moline, Ill., a corporation of Illinois Application April 13, 1931. Serial No. 529,586

32 Claims. (Cl. 56—18)

This invention relates to harvesters and more particularly to a corn harvester attachment for converting the conventional harvester to a tank type embodying features of construction whereby the attachment may be readily associated with a nontank type corn harvester without requiring any substantial modification or alteration of the harvester.

Tank type corn harvesters are known to the art but these harvesters are originally so constructed as to embody the storage tank and associated parts in original assembled relation providing an integral structure intended to be employed as a unit. These structures are such that the combination is not intended for disassembly, thus requiring employment of the entire implement as a unit so that in cases where it is desired to employ the picker portion of the implement by itself, the arrangement does not permit of such adaptation of the picker portion. Furthermore, there are in existence and in extensive use at the present time picker mechanisms alone, and it may be desirable in many cases to convert such mechanisms to the tank type.

Accordingly, the present invention contemplates in its main object, the provision of a grain tank structure in the nature of an attachment adapted to be associated with a corn harvester. By the provision of such an attachment for nontank type corn harvesters, the necessity for drawing a wagon or similar container conveyance and the employment of a conveyor discharging into such wagon or conveyance is eliminated thus dispensing with attendant required hitch arrangements and providing a combined structure adapted to operate as a unit.

Another object of the present invention resides in the provision of such an arrangement whereby such operative parts as may be required to convey matter discharged by the corn harvester to the grain tank wherein such operating parts are driven from the power plant of a drawing vehicle such as a tractor. Since it is now the common practice to transmit power for operating the usual moving parts of the corn harvester from the power plant of the tractor, it is desirable that such moving parts as may be employed for conveying matter from the harvester to the tank be likewise power operated. Accordingly, in carrying out this feature of the present invention, the arrangement contemplated is such that power transmission may be readily effected to the attachment moving parts.

A further feature of the present invention resides in the provision of such an attachment as may be quickly, readily and simply associated with a corn harvester requiring little or no alteration or modification of the harvester structure for purposes of accomplishing the conversion hereinbefore referred to.

Another feature of the present invention resides in the provision of an arrangement wherein such extension of the supporting parts of the harvester as are necessary to accommodate the attachment is such that the support for the combination is substantial and rugged, this being accomplished by the provision of suitable reinforcement for the supporting structure.

A further object resides in the provision of novel auxiliary draft connections for the attachment which are adapted to be associated with the usual draft connections of the harvester whereby little or no additional strain is imposed upon the frame structure and draft connections of the harvester itself. Such a construction is particularly advantageous for employment with a harvester of the type wherein the picking and husking mechanisms are so mounted upon a single rigid frame as to be balanced across the supporting axle, and wherein the raising and lowering of the picking mechanism is accomplished by rocking of the frame of the harvester about the supporting axle.

Other and further features of the present invention will appear from the following detailed description of a preferred embodiment of the invention, illustrated in the accompanying drawings in which:

Figure 1 is a plan view of the attachment in its assembled relation with a corn harvester, parts being shown in section, such section being taken substantially along the line 1—1 of Figure 2;

Figure 2 is a section in elevation of the combined structure in assembled relation, such section being taken substantially along the lines 2—2 of Figure 1; and Figure 3 is an enlarged fragmentary section taken along the line 3—3 of Figure 1.

Referring now more particularly to Figures 1 and 2, the corn harvester structure disclosed therein is more or less diagrammatically illustrated, since such structure per se does not form a part of the present invention. Briefly, the harvester comprises a main frame 4 preferably of angle iron construction supported substantially midway thereof upon a transversely extending axle 5 normally supported at either end by ground engaging wheels such as 6. A portion of the main frame extends fore and aft with respect to the axle in balanced relation, such portion of the frame supporting thereon and forwardly thereof a pair of component parts 7 embodying the usual snapping rolls and gathering chains, and associated mechanisms. The latter mechanisms embody a deflecting shield 8 which is adapted to direct snapped matter from the snapping rolls and gathering chains to a longitudinally disposed conveyor 9 which in turn directs the matter to a plurality of husking rolls 11 arranged to operate in parallel relation to the axle 5 along the rear portion of the harvester frame. These rolls are arranged to discharge toward the stubbleward side of the harvester through a suitable chute as will more specifically hereinafter appear. The main frame of the harvester is provided with a forwardly and angularly directed draft hitch or frame 12 formed of a pair of forwardly converging longitudinal members suitably trussed for reinforcement.

Power for operating the moving parts of the harvester, is transmitted from a suitable power take-off connection provided upon the draft vehicle or tractor (not shown) by means of an articulated line of shafting 13 suitably supported upon the draft frame 12 and including suitable universal joints for accommodating angular disposition of the sections of the shafting. The articulated line of shafting 13 transmits rotary motion to a drive shaft 14 suitably supported on the harvester frame in any desired manner. From this shaft 14, power may be suitably transmitted to the various operating parts of the harvester by means of suitable sprocket and chain connections.

The grain storage attachment comprises an axle 15 preferably of the same diametric dimension as axle 5 of the harvester, the inner end of which has suitably secured thereto a splining sleeve 16. Sleeve 16 extends beyond the inner end of axle 15 and is adapted to take over the stubbleward side end of shaft 5 upon removal of the harvester ground engaging wheel usually supported at this end of the harvester axle 5. Sleeve 16 may be removably secured to both axles 5 and 15 by means of a plurality of transversely extending pins or bolts 16'. Adjacent the extreme inner end of sleeve 16, there is provided a downwardly extending integrally formed ledge, projection, or lug 17, the extreme lower end of such projection being suitably forked to provide a saddle. The outer end of axle 15 supports a relatively wide tread wheel 18 preferably disposed so as to be spaced inwardly from the extreme outer end of shaft 15.

Adjacent the inner side of wheel 18, the axle 15 is provided with a sleeve 19 which may be retained against axial movement along the axle 15 by a pair of suitable thrust collars such for example as 21. Harvester axle 5 has suitably secured thereto adjacent the ground engaging wheel 6, and between the latter and the harvester frame, a clip 22. To suitably reinforce the harvester axle 5 and the attachment or extension axle 15, a truss rod 23 has its one end suitably pivotally connected with the bracket 19 while the other end is similarly connected to the clip 22, rod 23 being provided with a suitable turnbuckle 24 by means of which tension adjustments may be made, an intermediate portion of the rod 23 resting in the saddle of the lug 17 so as to impose an upward thrust upon the splining sleeve 16. The combined axles 5 and 15, are thus suitably reinforced particularly at their juncture points.

A sleeve 25 is suitably journaled upon the end of the harvester axle 5 adjacent the inner end of the splining sleeve 16.

Referring now more particularly to Figures 1 and 2, a pair of spaced apart angle iron members 26 and 27 are suitably supported upon the combined axles 5 and 15, member 26 being connected to sleeve 25 and member 27 to sleeve 19, such members extending rearwardly in parallel relation and having their rear ends secured by a transverse member 28, such members constituting the main frame 20 of the attachment. The forward ends of frame members 26 and 27 converge toward each other as indicated at 29 and 31, respectively, the latter being slightly longer than the former, with portion 29 having its end suitably secured to portion 31 adjacent the latter's forwardmost end. The extreme forward end of portion 31 is suitably removably connected to the forward end of draft frame 12 at 32. Thus, the converging portions 29, 31 of the main frame of the attachment which constitute a draft portion for the attachment are so associated with the draft frame 12 of the harvester that draft forces imposed upon the draft frame 12 are also transmitted to the draft frame portion of the main frame of the attachment. As will be clearly apparent from Figure 1, since the draft frame of the harvester is preferably angularly disposed with respect to the axle and main frame of the harvester whereby a drawing vehicle such for example as a tractor is disposed in cooperative relation to one side of the harvester operating mechanisms, by the provision of such a frame portion for the attachment as to have draft forces transmitted to the attachment, no necessary strain is imposed upon the draft frame 12 of the harvester as would be imposed thereupon in the absence of the draft portion of the frame of the attachment.

A tank 33 is supported upon the main frame of the attachment in vertical spaced relation with respect thereto and upon a superstructure generally indicated at 34 comprising a plurality of truss members 35 having their lower ends suitably secured to the outer frame portion 27 of the main frame of the attachment, such truss members being suitably secured at their upper ends in longitudinally spaced relation to a bracket 36 rigidly interconnecting such upper ends of members 35 and in turn suitably secured to the inner under side of the tank 33. Bracket 36 also has suitably secured thereto a vertical angle iron member 37 which has its lower end suitably secured to the frame member 26. Member 37 may be suitably braced to the frame member 26 by a truss rod 37'. Adjacent their lower ends truss members 35 have a plurality of upwardly and outwardly extending truss members 38 secured thereto, the upper ends of such members 38 being suitably secured to the tank 33 adjacent its outer lower edge. A truss member 39 is suitably anchored to the tank 33 at the juncture of members 38 with such tank, member 39 extending downwardly and through the members 35 and having its lower end suitably secured to the frame portion 26 thus providing a connecting brace between the outer edge of tank 33 and the inner frame portion 26. These truss members 35, 37, 38 and 39 constitute the superstructure 34.

To suitably reinforce the tank superstructure in the assembled relation of the harvester and attachment, a plurality of brace members have been provided, some of these members being adapted to be detachably connected to portions of the harvester, while others are connected to portions of the attachment. To additionally brace the superstructure 34 and the tank supported thereby from inward lateral displacement due to vibration of the combined harvester and attachment in operation, a pair of brace members 41 and 42 have been provided, the lower ends of such members being suitably secured to a plate 43 which is in turn detachably secured to the outer longitudinal member 44 of draft frame 12 of the harvester adjacent the rear end thereof. These brace members 41 and 42 extend upwardly in divergent relation and are suitably secured at their upper ends to the inner under side of the tank 33. To further substantially brace the superstructure against rearward movement about the axle 15 as an axis, a truss member 45 has been provided, the upper end of such truss member being suitably secured to the cross member or bracket 36 interconnecting the upper ends of truss members 35 adjacent the forward end thereof, the lower end of truss member 45 being suitably secured to the draft portion formed by the convergent portions 29 and 31 of the main frame side members 26 and 27, respectively, of the attachment, such forward end of the truss member 45 being preferably secured to the draft portion at the juncture of portion 29 with portion 31.

To additionally insure of substantial support of the discharge side of the tank 33 particularly in view of the fact that the bottom of such tank slopes downwardly toward its outer edge so that a substantial portion of weight normally has its center of gravity disposed in proximity to the line of maximum support provided by the ground wheel 18, an additional bracing frame or truss structure has been provided. As has been hereinbefore noted, the axle 15 extends outwardly beyond the hub of the ground engaging wheel 18. Upon such extending portion, there is mounted a collar 46 which cooperates with the outer end of the hub of wheel 18 to retain such wheel in position upon axle 15, collar 46 having an angle iron bracket 47 suitably bolted thereto on the upper side thereof. A pair of tubular brace or truss members 48 and 49 have their lower ends suitably secured to the vertical flange of the angle iron bracket 47 and extend upwardly therefrom in divergent relation, their upper ends being suitably secured to the opposite outer and under corners of the tank 33. It will be readily apparent that these members 48 and 49 serve to substantially reinforce the truss members 38 and 39 of the superstructure 34 and at the same time serve to transmit the weight of the load which may be carried in the tank 33 to the axle 15 through which such weight is transmitted to the wheel 18. Thus, the cooperation of members 48, 49 and 38 is such as to substantially straddle the wheel 18 whereby the major portion of the load carried by the tank 33 is practically directly transmitted to the axle 15 to points on opposite sides of the wheel 18 thereby materially reducing downward forces which may be imposed upon the side frame portion 26 of the main frame of the attachment through the truss members 37 so that only very little strain is imposed upon the splining sleeve 16 and at the same time maintaining the forces transmitted to the harvester axle 5 at a minimum thereby eliminating any requirement of material strengthening of axle 5 of the harvester. Thus with the improved attachment construction, no material alteration of the original harvester structure is involved.

To suitably convey harvested matter in the present instance, husked corn ears and shelled corn from the discharge portion of the harvester to the tank 33, there is provided a vertically arranged bucket type elevator conveyor 51. Conveyor 51 comprises a substantially rectangular elongated housing 52 suitably supported adjacent its lower end from the rear transverse frame member 28 by a pair of brackets 53 suitably secured to the side walls of the housing 52 and to the vertical flange of the frame member 28. A bucket type conveyor is mounted within the housing 52 and comprises a pair of endless chains 55 suitably trained over idler gears or sprockets disposed at the upper and lower ends of the housing 52. Adjacent its lower end, housing 52 is provided along its forward side with a substantial opening 56 (see Figure 3) about which is disposed a hopper 57. This hopper is provided at its inner side with a chute portion 58 into which a pair of discharge chutes 59 and 61 extend, chute 59 constituting the husked ear discharge conveyor while chute 61 constitutes the shelled corn discharge conveyor. Thus, both husked ears and shelled corn are discharged into the hopper 57 and deposited in the bottom of the housing 52 of the elevator conveyor 51 by the sloping bottom of the hopper 57. As buckets 62 pass through the lower end of the housing 52, they scoop up the harvested ears and shelled corn deposited in the bottom of the housing 52 and convey such matter upwardly for discharge into the upper open side of tank 33. If desired, the bottom of the housing 52 may be provided with a hinged closure 63.

Adjacent its upper end, housing 52 is suitably braced to the tank 33 by truss members 64 and 65 which may have their upper ends suitably secured to the side walls of the housing 52 and the lower ends secured to the upper side edges of the tank 33 preferably adjacent the forward side edge thereof.

To provide a suitable drive for the elevator conveyor 51, there is provided adjacent the upper end of the housing 52 a transverse drive shaft 66 which may be journaled in the housing in any preferred or desired manner, such shaft being provided with gears or sprockets meshing with the chains of the conveyor to impart movement thereto. At the inner side of the elevator conveyor housing 52 there is mounted a suitable gear box 67 which preferably contains a worm and worm wheel for transmitting rotary movement to the shaft 66, the worm wheel being of course preferably mounted on shaft 66 while the worm is provided upon a vertically extending stub shaft 68 having its lower end extending downwardly and provided with a universal joint 69.

As has been hereinbefore pointed out, drive or power transmission for the moving parts or mechanism of the harvester is transmitted to a main drive shaft 14 suitably journaled upon the frame of the harvester, the forward end of such shaft being connected to an articulated line of shafting 13 preferably supported upon the draft frame 12 of the harvester and extending forwardly for cooperative connection with a suitable power take-off mechanism carried by a propelling vehicle such for example as a tractor. Referring now more particularly to Figures 1 and 2, for purposes of transmitting power to the elevator conveyor, shaft 14 has mounted thereon a spur gear or sprocket 71 which drives a sprocket 72 through a chain 73. Sprocket 72 is preferably loosely carried upon a horizontally extending shaft projecting rearwardly from a gear box 74 removably supported upon an auxiliary framework which is removably attached to the frame of the harvester. Sprocket 72 is preferably provided at its hub with clutch teeth which are adapted to cooperate with a spring urged clutch member suitably splined to the shaft of the gear box 74. Such clutching arrangement provides for slippage between the power transmission means and the power transmitting connections to the elevator conveyor in the event of excessive resistance imposed upon the elevator conveyor in the course of operation, thus eliminating the possibility of breakage of parts.

The framework for supporting gear box 74 upon the frame of the harvester, comprises a substantially shallow U-shaped vertically extending angle iron member 75 preferably bolted to vertically spaced portions of the frame of the harvester by means of a horizontal bracket 76, the juncture between brackets 75 and 76 being suitably reinforced by a truss member 77. Housing 74 preferably contains a pair of beveled gears one of which is suitably connected to the shaft upon which the sprocket 72 is mounted, and the other of which extends vertically from the housing 74 as indicated at 78, shaft 78 being suitably connected with a universal joint 79. Universal joints 69 and 79 are suitably interconnected by a shaft 81 whereby power transmitted to the gears of the gear box 74 through the slippage clutch from the drive shaft 14 is transmitted to the gear box operating parts disposed adjacent the upper end of the elevator conveyor housing 52 for imparting movement to the elevator conveyor.

By providing power transmission to drive the elevator conveyor at the top thereof, strain on the sprockets and bearings thereof is minimized since the loaded side of the conveyor is thus pulled up at the point of most effective application of operating force.

As has hereinbefore been pointed out, tank 33 is preferably of the sloping bottom type whereby matter stored therein may be discharged adjacent the outer lower edge thereof into suitable receptacles or into a storage bin as desired. At its discharge end, tank 33 is provided with a discharge chute 82 which is pivotally connected at 83 to the lower outer edge of the tank and is opened and closely by means of an operating mechanism generally indicated at 84. Such operating mechanism 84 comprises a pair of links 85, one at each side of the tank, such links being suitably secured to the sides of the chute 82. The inner ends of the links 85 are pivotally connected as indicated at 86 to the ends of the leg portions of a rock shaft 87 the intermediate portion of which is suitably journaled in bearing brackets secured to the under side of the tank 33. Rock shaft 87 is operated preferably through a crank 88 fixed to the rock shaft 87 in any preferred or desired manner and extending outwardly beyond the outer side of the tank 33 for accessibility by an operator. To normally urge the chute 82 to inoperative or closed position, a coil spring 89 may be provided. This spring will of course aid in closing the chute when desired.

The upper forward side of the housing 52 of the elevator conveyor 51 may be open and a suitable chute 91 secured to the housing 52 to receive and convey matter discharged by the buckets 62 as they pass over at the upper end of the elevator conveyor and discharge downwardly, chute 91 directing the discharged matter into the tank 33. Chute 91 is preferably so disposed as to discharge to the center of the tank for even loading of the tank.

Thus, it will be apparent from the above detailed description of the embodiment of the present invention, that we have provided a tank attachment adapted to be removably attached to a corn harvester involving no material change or alteration of the harvester structure itself. To associate the attachment with the harvester it is only necessary to remove the usual elevator conveyor employed to convey harvested matter discharged by the harvester operating mechanism to a wagon or other receptacle type vehicle normally drawn alongside the harvester and to remove the stubbleward side ground engaging or supporting wheel from the usual axle of the harvester. Otherwise, the usual harvester remains intact. In associating the attachment with the harvester, the splining sleeve is of course first connected with the harvester axle and the brace rod clip 22 attached to the harvester axle. Upon proper adjustment of the brace rod 23, the truss rods or members 41 and 42 have their common plate 43 suitably removably secured to the draft frame member 44, and the draft portion of the main frame of the attachment is then removably secured at 32 to the tongue portion of the draft frame 12 of the harvester. Subsequently, the gear box 74 is properly mounted upon the frame of the harvester and the chain 73 placed over the sprockets 71 and 72. As has been hereinbefore pointed out, since draft forces are transmitted to the frame of the attachment by virtue of the securement of the draft portion of the attachment frame to the draft portion 12 of the harvester frame, no additional or extra strain is imposed upon the harvester draft frame or the main frame or axle of the harvester. Since the tank 33 is preferably of the outwardly sloping bottom type wherein the major portion of the weight of the harvested matter stored in the tank is so deposited in the tank as to have its center of gravity normally disposed closer to the outer side of the tank than to the inner side thereof, and since the truss frame providing the superstructure 34 is arranged to transmit most of the reacting or supporting forces to the outer side frame member 27 of the attachment frame and further in view of the provision of the additional brace structure comprising the tubular members 48 and 49, the major portion of the weight of such matter as is carried by the tank 33 in the course of movement of the combined assembled construction in operation is supported upon the wheel 18. For this reason, the ground engaging wheel 18 is preferably of a relatively wide tread as compared to the usual supporting wheel, such for example as 6 of the harvester. The attachment in its assembled condition with the harvester is suitably braced to reinforce the superstructure 34 as against lateral distortion particularly such distortion as might take place inwardly, by brace members 41 and 42, such bracing effect being in counteracting relation to the truss rod 23 whereby the latter functions to prevent any undue stresses being transmitted to the splined juncture of the harvester shaft or axle 5 and the attachment or extension axle 15. In assembled relation, the combined structure is therefore substantially rigid and rugged, thereby providing durability in operation over rough or uneven ground such as is generally encountered in the harvesting of corn.

Since the present arrangement is such that the tank attachment may be assembled with a harvester or readily disassembled therefrom, the present invention readily lends itself to quick and ready conversion of the usual non-tank type harvester to one of the tank type without involving any material modification or alteration of the harvester. Consequently, the usual harvester may be readily converted to a tank type harvester or very readily reconverted to the usual type of corn harvester as desired to accommodate conditions as they may be encountered in the actual harvest of corn. At the same time, the attachment very readily lends itself to association with harvesters already in use by virtue of its being readily associable with such harvesters thus eliminating the requirement of the maintenance on hand by the user or farmer of two independent mechanisms, one of which would necessarily be in storage or in a condition of non-use while the other is being employed.

While we have disclosed a preferred embodiment of our invention, it will be understood that we do not wish to be limited thereto. As will be understood by those skilled in the art, such changes may be made therein without departing from the essence of the invention or the spirit and scope of the appended claims.

What we claim and desire to secure by Letters Patent is:

1. The combination with a harvester comprising a supporting frame having wheel receiving means, of a storage tank attachment having wheeled means adapted to be associated with said wheel receiving means and providing with said wheel receiving means a common support for the combined harvester and attachment.

2. The combination with a harvester comprising a frame having a wheel receiving axle, of a storage tank attachment comprising a frame having a wheel receiving axle, and means for splining said axles together to provide a common support for the combined harvester and attachment in assembled condition.

3. The combination with a harvester comprising a frame having a wheel receiving axle, of a storage tank attachment comprising a frame having a wheel receiving axle, means for splining said axles together to provide a common support for the combined harvester and attachment in assembled condition, and means connected with said axles for strengthening the splined axles.

4. The combination with a harvester comprising a frame having a wheel receiving axle, of a storage tank attachment comprising a frame having a wheel receiving axle, means for splining said axles together to provide a common support for the combined harvester and attachment in assembled condition and adjustable means connected with said axles and cooperating with said splining means for strengthening the splined axles.

5. The combination with a harvester comprising a supporting frame having an axle adapted to receive removable wheels at its ends, of a storage tank attachment comprising a frame having an axle thereon and a supporting wheel at one end of said axle, a sleeve adapted to be received by the other end of said attachment axle and by one of the wheel receiving ends of the harvester axle, means for securing said axles together to provide a common axle for the harvester and attachment when combined, a lug depending from said sleeve and having a saddle at its end, and an adjustable truss rod having one end connected with the harvester axle adjacent the other wheel receiving end of said axle and the other end connected with the attachment axle adjacent its supporting end with an intermediate portion of said truss rod seated in said saddle for strengthening the connected axles.

6. The combination with a harvester comprising a frame and a wheel supporting axle, of a storage tank attachment comprising a frame, a superstructure extending upwardly from said attachment frame, an axle carried by said frame and adapted to be connected with said harvester axle and providing an extension thereof, and means for reenforcing said superstructure connected with said harvester frame.

7. The combination with a harvester comprising a main frame and a draft member therefor, of a storage tank attachment connected with said main frame and comprising an attachment frame including a draft member, a tank, a superstructure supporting said tank on said attachment frame, and means bracing said superstructure relative to said draft members.

8. The combination with a harvester comprising a frame, a wheel supporting axle, said frame being disposed for rocking adjustment on said axle, and a draft member, of an attachment comprising an attachment frame, a wheel supporting axle on said attachment frame and adapted to be connected to said harvester axle to provide an extension thereof, a superstructure carried by the attachment frame, a draft member associated with said attachment frame, and means bracing said superstructure relative to said harvester axle and said draft members.

9. The combination with a harvester comprising a frame and a draft member, of an attachment adapted to be associated with said harvester comprising a frame directly connected to said harvester frame and including a draft member, said draft members being interconnected for association with a drawing vehicle to transmit draft forces to both said harvester and attachment.

10. The combination with a harvester comprising a frame and a draft member, of an attachment adapted to be rigidly connected with said harvester frame and comprising an attachment frame terminating in a draft frame portion at its forward end, said draft member and draft frame portion being interconnected for association with a drawing vehicle as a unit to transmit draft forces to both said harvester and attachment.

11. The combination with a harvester comprising a frame supporting operating mechanisms, a draft member associated with said frame, and a power transmitting means connected with said mechanisms, of a tank attachment adapted to be associated with said harvester comprising an attachment frame carried by said harvester frame and draft member, a storage tank carried by said attachment frame, means for conveying harvested matter from said harvester to said tank, and power transmitting means connecting said harvester power transmitting means with said conveying means, said draft member being connected with said harvester to permit relative rocking movement between said tank attachment and said harvester.

12. The combination with a harvester comprising a frame supporting operating mechanisms, a draft member associated with said frame, and a power transmitting means connected with said mechanisms, of a tank attachment adapted to be associated with said harvester and its draft member comprising a frame, a storage tank carried by said frame in spaced relation thereto, means for receiving and conveying harvested matter from said harvester to said tank, means for imparting motion to said conveying means disposed adjacent said tank, and power transmitting connections cooperatively associating said motion imparting means and said power transmitting means, said draft member being connected with said harvester to permit relative rocking movement between said tank attachment and said harvester.

13. The combination with a harvester including a structure supporting operating mechanisms, a draft member associated with said structure, and a power transmitting means connected with said mechanisms, of a tank attachment adapted to be associated with said harvester and its draft member comprising a frame, a superstructure on said frame, a storage tank carried by said superstructure in spaced relation to said frame, an elevator conveyor carried by said frame for conveying harvested matter from said harvester to said tank, a gear box carried by the harvester structure and operatively connected with said power transmitting means, a second gear box carried by said elevator conveyor and adapted to impart operating motion thereto, and means cooperatively connecting the gear boxes for power transmission whereby said elevator conveyor may be power operated from the drawing vehicle, said draft member being connected with said harvester to permit relative rocking movement between said tank attachment and said harvester.

14. The combination with a harvester comprising a frame, operating mechanism carried by said frame including means adapted to discharge harvested matter to one side of said mechanism, and a wheel supporting axle extending across said frame, of a storage tank attachment adapted to be associated with said harvester laterally thereof including a frame, a wheel supporting axle carried by said latter frame, means connecting said attachment axle with said harvester axle and providing an extension of the latter axle, a superstructure carried by the attachment frame, a tank supported by said superstructure above said attachment frame, an elevator conveyor carried by said attachment frame and discharging into said tank, and a hopper at the lower end of said elevator conveyor adjacent said mechanism discharging means for receiving harvested matter from the harvester mechanism for transport to said tank.

15. A tank attachment for harvesters comprising a main frame, a single wheel supporting axle carried by said frame, means for attaching said axle to a harvester axle to provide an extension for the latter, a superstructure extending from said frame, a tank supported by said superstructure, and brace means connected with said tank and adapted to be detachably connected to a harvester frame.

16. A tank attachment for harvesters comprising a main frame, a single wheel supporting axle carried by said frame, a wheel journaled on said axle, said axle extending beyond the outer side of said wheel, a superstructure carried by said frame, a tank supported by said superstructure, and means bracing said tank from the axle extension.

17. A tank attachment for detachable connection with a harvester adapted to be propelled by a pulling vehicle, said tank attachment comprising a main frame having a pair of side members terminating at their forward ends in converging portions to provide a draft member for connection with said pulling vehicle, and means adapted to connect said side members intermediate their ends with the harvester to be supported thereon.

18. A tank attachment for connection with a harvester having a pivotally connected draft member and comprising a main frame having detachable connection with said harvester and draft member, a single wheel supporting axle carried by said frame, said frame being disposed in substantially balanced relation with respect to said axle, a superstructure carried by said frame, a tank supported by said superstructure, and an elevator conveyor carried by said frame and adapted to discharge into said tank, said superstructure, tank and elevator conveyor being so disposed on said frame as to be in substantially balanced relation with respect to said axle whereby the attachment may be readily rocked about its axle.

19. A tank attachment for harvesters comprising a frame terminating at its forward end in a converging draft portion, a single wheel supporting axle carried by said frame, said axle extending beyond the wheel, a superstructure carried by said frame, a tank supported by said superstructure, means bracing said superstructure and tank from the axle extension, brace means associated with said superstructure for attachment to a harvester, a bucket type elevator conveyor carried by said frame and extending upwardly from said frame to discharge into said tank, means for bracing said elevator conveyor to said tank, means associated with said elevator conveyor adjacent its upper end for imparting motion to the elevator conveyor, and power transmission means including means adapted to be connected to power transmission means on a harvester and connections between said power transmission means for operating said elevator conveyor.

20. A tank attachment for harvesters, said attachment including a frame having a draft tongue, means for connecting said draft tongue to the harvester, and separate means for disposing said attachment in fixed relation on said harvester.

21. A tank attachment for harvesters, said attachment including a body having draft means for connection with the harvester draft tongue, and means for detachably connecting said body directly with the harvester.

22. A tank attachment for wheeled harvesters including means interchangeable with one of the wheels of said harvester and connected with the latter, said means acting as a support for said harvester.

23. The combination with a harvester having a pivotally connected draft member, of a grain tank attachment comprising a wheel supported frame adapted to be attached to said harvester, and means for detachably securing said frame to said harvester and its draft member.

24. The combination with a wheeled harvester, of a grain tank attachment interchangeable with one of the wheels of said harvester, and means for detachably securing the tank attachment at lateral spaced points on said harvester.

25. The combination with a harvester having a pivotally connected draft member, of a grain tank attachment for said harvester, means for detachably securing one side of the tank attachment at fore and aft spaced points on said harvester and its draft member respectively, and means connected with said attachment and reacting against the ground to support the other side of said attachment.

26. The combination with a wheeled harvester, of a grain tank attachment interchangeable with one of the wheels of said harvester, and means for detachably securing the tank attachment to said harvester at lateral spaced points positioned fore and aft on the harvester.

27. The combination with a harvester having a main frame and a draft frame, of a tank attachment for said harvester, and means for detachably securing said tank attachment to said harvester at spaced points on the main and draft frames respectively.

28. The combination with a harvester having a main frame, a draft member, and an axle for said frame, of a tank attachment for said harvester, and means for detachably connecting the tank attachment with the axle and draft member of said harvester.

29. The combination with a wheel supported harvester having a main frame and an axle for said frame, of a wheel supported tank attachment adapted to replace a wheel of said harvester and to support one side of the latter, and means for detachably securing said tank to the harvester at spaced points on said frame and axle respectively.

30. A tank attachment for harvesters comprising a main frame having a pair of side members terminating at their forward ends in converging portions to provide a draft member, said draft member being adapted for connection with a pulling vehicle, and detachable means for connecting said main frame with a harvester.

31. The combination with a harvester having a pivotally connected draft member, of a grain tank attachment adapted to be attached to the harvester and draft member, and means for detachably securing said frame to said harvester and its draft member.

32. The combination with a harvester having a pivotally connected draft member, of a grain tank attachment for said harvester, and means for detachably securing the tank attachment at fore and aft spaced points on said harvester and its pivotally connected draft member respectively.

LOUIS A. PARADISE.
WILBUR J. COULTAS.